C. Buckley, Jr.,

Nut Lock,

№ 69,173. Patented Sept. 24, 1867.

Witnesses;
R. F. Osgood

Inventor;
Chas Buckley jr
By J. Fraser & Co.
Attys

United States Patent Office.

CHARLES BUCKLEY, JR., OF ROCHESTER, NEW YORK.

*Letters Patent No. 69,173, dated September 24, 1867.*

---

IMPROVEMENT IN NUT-FASTENER.

---

*The Schedule referred to in these Letters Patent and making part of the same.*

---

TO ALL WHOM IT MAY CONCERN:

Be it known that I, CHARLES BUCKLEY, Jr., of the city of Rochester, in the county of Monroe, and State of New York, have invented a new and improved Nut-Fastener; and I do hereby declare that the following is a full and exact description thereof, reference being had to the accompanying drawings, and to the letters of reference marked thereon, making a part of this specification.

Similar letters of reference indicate corresponding parts in all the figures.

This invention relates to a new and improved method of securing the nut of a screw-bolt at any point on the bolt at which it may be placed; and the invention consists in the employment of a washer secured from turning on the bolt, and provided with one or more concentric shoulders or flanges on its face towards the nut, so that a jam-key or wedge may be driven in between the square side of the nut and the said shoulder, and the nut thereby secured against working off or becoming loose.

Figure 1:
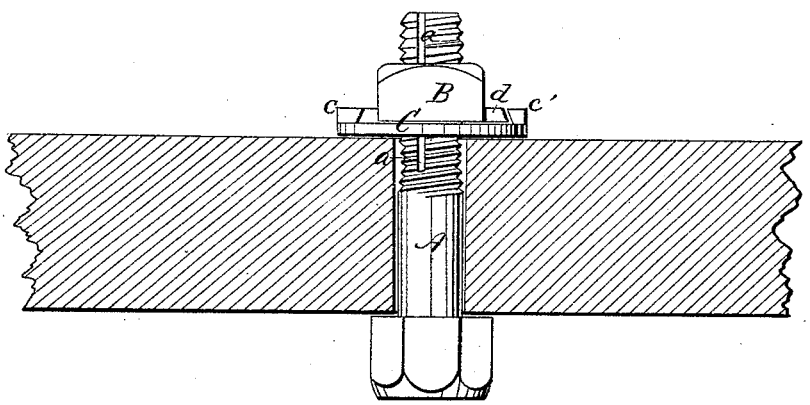
Figure 1 is a face view of my invention.
Figure 2:
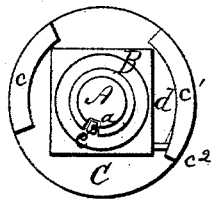
Figure 2 is an end view of the same.
Figure 3:
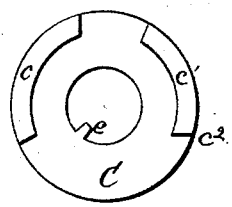
Figure 3 is a detail view, showing the removable washer.

In the accompanying drawings, A is the screw-bolt, of usual form, in which is cut, longitudinally, a groove, $a$, fig. 1. C, fig. 3, is a removable washer, having a projecting nib, $e$, on the edge of its eye, which runs in the groove $a$ of the bolt, or it may be otherwise secured against turning, and having also one or more concentric shoulders or raised flanges, $c\ c'$, for holding the key $d$ against one of the flat sides of the nut, and thereby preventing the latter from being turned. B is the usual nut, and $d$ the key or jam-wedge, which is made of soft iron, so as to drive easily and adapt itself to the form of its socket. It will be seen that the ends $c^2$ of the shoulders are so drawn in toward the nut B that the key $d$, fig. 2, when driven in, springs the throat $c^2$, so that when the key $d$ is in place, it cannot work out. The key is always forced into its seat in such a direction that a backward turning of the nut draws the key more firmly into its seat, and tightens the same. As a side of the nut may not always be brought into proper position, or opposite to one shoulder, when the nut has been screwed down snug, the second shoulder $c^1$ is provided, and its position on the face of the washer is such that it may be used for jamming the nut if the nut should present a corner to the opposite shoulder when screwed down closely; and in like manner shoulder $c$ may be used when a side of the nut is not presented fairly to shoulder $c^1$. In this manner, by having more than one shoulder, the points in one of its revolutions, at which the nut may be secured, are increased, and with a four-sided nut and two shoulders the locking points in a single turn of the nut are eight in number. And if a six-sided nut is used, these locking points are then increased to twelve for each turn of the nut, when two shoulders are used, as shown. The contact edges of the key $d$ and shoulders $c\ c^1$ are bevelled or dove-tailed, as seen in fig. 1, so that the wedge cannot work sidewise out of its seat.

Various devices have before been employed for holding nuts in place on screw-bolts, for instance, by springs resting against the square sides; but these are not only very insecure, but in most instances they are not capable of adjusting to different positions on the screw. By my device it will be seen that as the washer slides up and down free on the bolt, it may be adjusted and tightened in any position. And when the key $d$ is driven tightly in place, it forms, so to speak, a cement or solid body between the nut and the washer, so that the whole is perfectly firm. This is a matter of much importance where there is constant action and jar, as, for instance, in locomotives.

I do not confine myself to the use of the groove and nib for fixing the washer, as it may be done by any other means and accomplish the same result.

Having thus described my invention, what I claim as new, and desire to secure by Letters Patent, is—

The combination of the concentric shoulders $c\ c^1$ of the fixed washer C with the key $d$, nut B, and bolt A, arranged and operating substantially as and for the purposes set forth.

In witness whereof I have hereunto signed my name in the presence of two subscribing witnesses.

CHARLES BUCKLEY, JR.

Witnesses:
J. F. W. WHITBECK,
R. F. OSGOOD.